(12) United States Patent
Fontaine et al.

(10) Patent No.: US 10,598,884 B2
(45) Date of Patent: Mar. 24, 2020

(54) FIBER OPTIC CASSETTE SYSTEM WITH RELEASABLE ENGAGEMENT

(71) Applicant: BELDEN CANADA INC., Saint-Laurent (CA)

(72) Inventors: Marc Fontaine, Les Cèdres (CA); Vincent Pilon, Lachine (CA); Olivier Kedzierski, Notre-Dame de l'Île-Perrot (CA)

(73) Assignee: BELDEN CANADA INC. (CA)

( * ) Notice: Subject to any disclaimer, the term of this patent is extended or adjusted under 35 U.S.C. 154(b) by 0 days.

(21) Appl. No.: 16/223,675

(22) Filed: Dec. 18, 2018

(65) Prior Publication Data

US 2019/0187394 A1 Jun. 20, 2019

Related U.S. Application Data

(60) Provisional application No. 62/607,444, filed on Dec. 19, 2017.

(51) Int. Cl.
*G02B 6/44* (2006.01)

(52) U.S. Cl.
CPC .......... *G02B 6/4455* (2013.01); *G02B 6/4452* (2013.01)

(58) Field of Classification Search
CPC ................................................... G02B 6/4453
See application file for complete search history.

(56) References Cited

U.S. PATENT DOCUMENTS

| 8,452,148 B2 * | 5/2013 | Cooke | G02B 6/4452 385/135 |
| 9,678,295 B2 * | 6/2017 | Giraud | G02B 6/4452 |

* cited by examiner

*Primary Examiner* — Omar R Rojas
(74) *Attorney, Agent, or Firm* — Lavery, De Billy, LLP; Hugh Mansfield (57) ABSTRACT

A modular fiber optic cassette and tray assembly is disclosed. The assembly comprises a tray engaging part which engages with a cassette engaging part on the tray and such that the cassettes may be arranged horizontally side by side on the trays. The cassettes are mounted to a front of a tray and such that a portion of each cassette is positioned in front of the tray. In an embodiment, a release mechanism such as a push button is provided on top of each cassette for disengaging the tray engaging part from the cassette engaging part. Still in another embodiment a plurality of trays and cassettes are provided stacked on top of one another.

18 Claims, 11 Drawing Sheets

FIBER OPTIC CASSETTE SYSTEM WITH RELEASABLE ENGAGEMENT

CROSS REFERENCE TO RELATED APPLICATIONS

This application claims benefit under 35 U.S.C. § 119(e) of U.S. provisional application Ser. No. 62/607,444 filed on Dec. 19, 2017 which is incorporated herein in its entirety by reference.

FIELD OF THE INVENTION

The present invention relates to a fiber optic cassette system with releasable engagement.

BACKGROUND TO THE INVENTION

The prior art discloses a fiber optic cassette system comprising a rack which receives a number of like cassettes received side by side. Typically such cassettes comprise a flange about the front face which is used to secure the cassette into the rack, often by using a screw, push-pin retainer, or the like. One draw back of such prior art devices, especially in high density high density environments, is that the flange occupies space along the front of the racks which could otherwise be used to accommodate receptacles which terminate optic fiber cables.

In other implementations the cassettes are arranged horizontally, but a mounted into structures which increase tray width Additionally, in some cross connect implementations the fiber optic cassettes are received on slidable trays. One drawback of such trays is that the cassettes are typically held entirely on the trays and as such the trays add a small yet not negligible thickness to the overall assembly which in turn affects the overall density pf the assembly.

SUMMARY OF THE INVENTION

In order to address the above and other drawbacks, there is provided a modular fiber optic cassette system. The system comprises a case comprising a plurality of trays slideably received within a tray receiving space for movement between a stored position and an accessible position, a plurality of substantially flat rectangular fiber optic cassettes each arrangeable in parallel side by side along a front end of a respective one of the plurality of trays and such that when mounted on the respective one of the trays a forward portion of a housing of each of the cassettes extends in front of the respective one of the trays, and further wherein each of the cassettes comprises a first optic fiber connector-receiving receptacle arranged along a cassette housing front face within the forward portion for receiving a terminated end of the at least one first optic fiber, a second optic fiber connector-receiving receptacle arranged along a cassette housing rear face for receiving a terminated end of the at least one second optic fiber, and at least one third optic fiber within the housing, each of the at least one third optic fiber for interconnecting the terminated ends of respective ones of the at least one first optic fiber and the at least one second optic fiber, and an engagement between a bottom surface of each of the fiber optic cassettes and the tray, the engagement comprising a first part on the cassette bottom surface and a second part on the tray.

There is also provided a modular fiber optic cassette system. The system comprises a case defining a tray receiving space, at least one tray slideably received within the tray receiving space for movement between a stored position and an accessible position, a plurality of substantially flat rectangular fiber optic cassettes arrangeable horizontally side by side and in parallel along a front end of the at least one tray, each of the cassettes comprising a cassette housing and a first optic fiber connector-receiving receptacle arranged along a cassette housing front face for receiving a terminated end of the at least one first optic fiber, a second optic fiber connector-receiving receptacle arranged along a cassette housing rear face for receiving a terminated end of the at least one second optic fiber, and at least one third optic fiber within the cassette housing, each of the at least one third optic fiber for interconnecting the terminated ends of respective ones of the at least one first optic fiber and the at least one second optic fiber, an engagement between a bottom surface of each of the fiber optic cassettes and the tray, the engagement comprising a first engaging part on the bottom surface and a second engaging part on the tray, and an actuator positioned on an upper surface of the cassette for disengaging the first part from the second part.

Also, there is provided a modular cassette for mounting with other like cassettes in a rack comprising a cassette receiving tray and interconnecting the terminated end of at least one first optic fiber with the terminated end of at least one second optic fiber, the tray comprising a plurality of cassette engaging features on an upper surface. The cassette comprises a substantially flat rectangular housing comprising a substantially flat bottom surface, a first optic fiber connector-receiving receptacle arranged along a cassette housing front face for receiving the terminated end of the at least one first optic fiber, a second optic fiber connector-receiving receptacle arranged along a cassette housing rear face for receiving the terminated end of the at least one second optic fiber, and at least one third optic fiber within the cassette housing, each of the at least one third optic fiber for interconnecting the terminated ends of respective ones of the at least one first optic fiber and the at least one second optic fiber, a tray engaging feature extending from the bottom surface and configured for engaging with one of the cassette engaging features, and a release mechanism comprising an actuator positioned on an upper surface of the cassette for selectively disengaging the tray engaging feature from the engaged one of the cassette engaging features.

DETAILED DESCRIPTION OF THE ILLUSTRATIVE EMBODIMENTS

Figure 1:
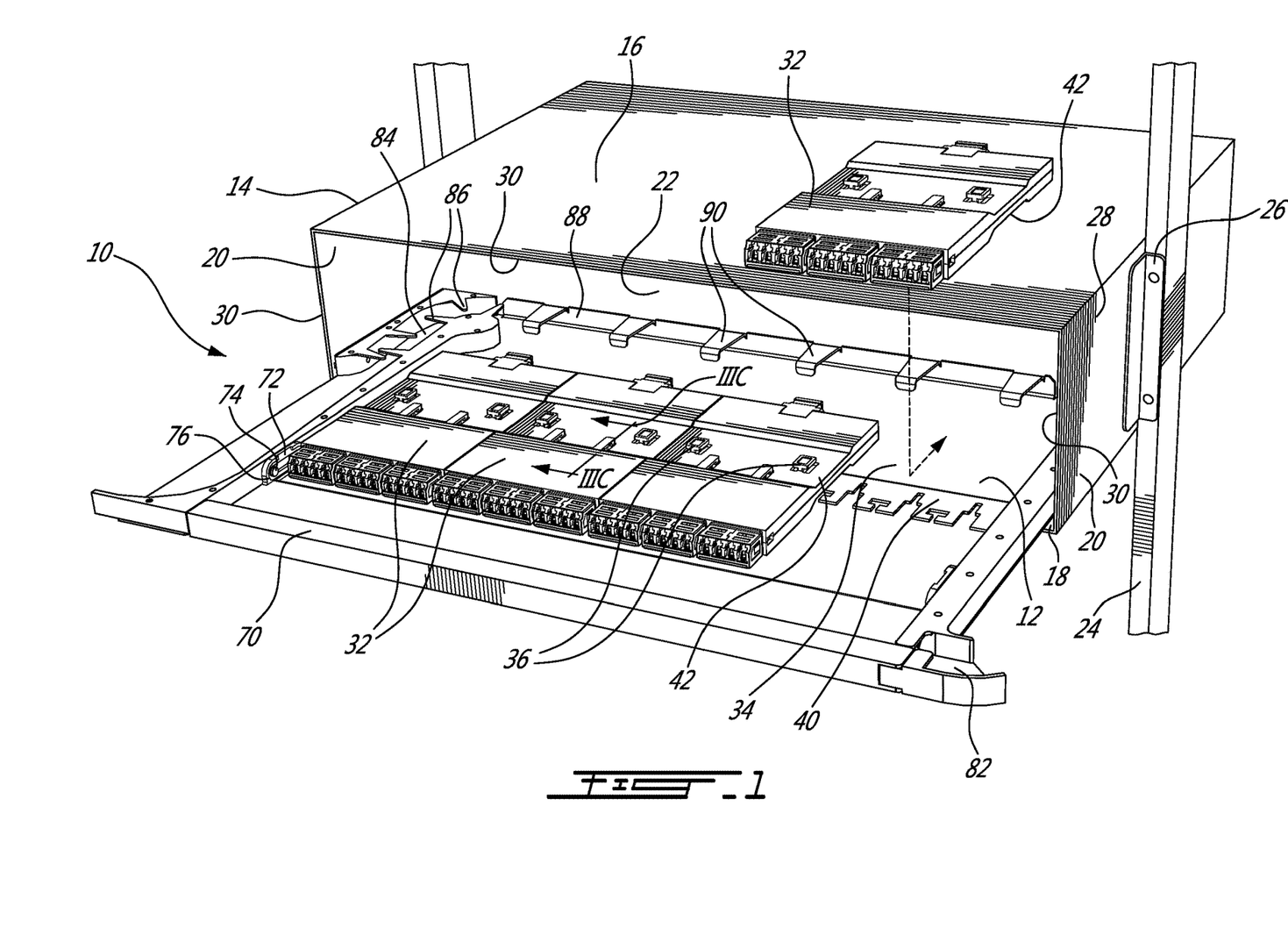
FIG. 1 provides a raised right front perspective view of a fiber optic cassette system in accordance with an illustrative embodiment of the present invention.

Referring now to FIG. 1, a fiber optic cassette system with release, generally referred to using the reference numeral 10, will now be described. The fiber optic cassette system 10 comprises a slideable tray 12 illustratively mounted within a case 14. The case 14 comprises a top wall 16, a bottom wall 18 and a pair of opposed side walls 20 defining a tray receiving space 22 therebetween. The case 14 is illustratively mounted on the rails 24 of a rack via a pair of mounting brackets 26 wherein one of the brackets 26 is attached to an outer surface 28 of a respective one of the sidewalls 20. The front edges 30 of the walls 16, 18, 20 define an opening via which the tray receiving space 22 can be accessed. In a particular illustrated embodiment the system 10 is shown for mounting in a 19" rack, however in a particular embodiment the system 10, with suitable modifications, may be mounted equally in a cross connect system, fiber bay or wall mount or the like.

Figure 2:
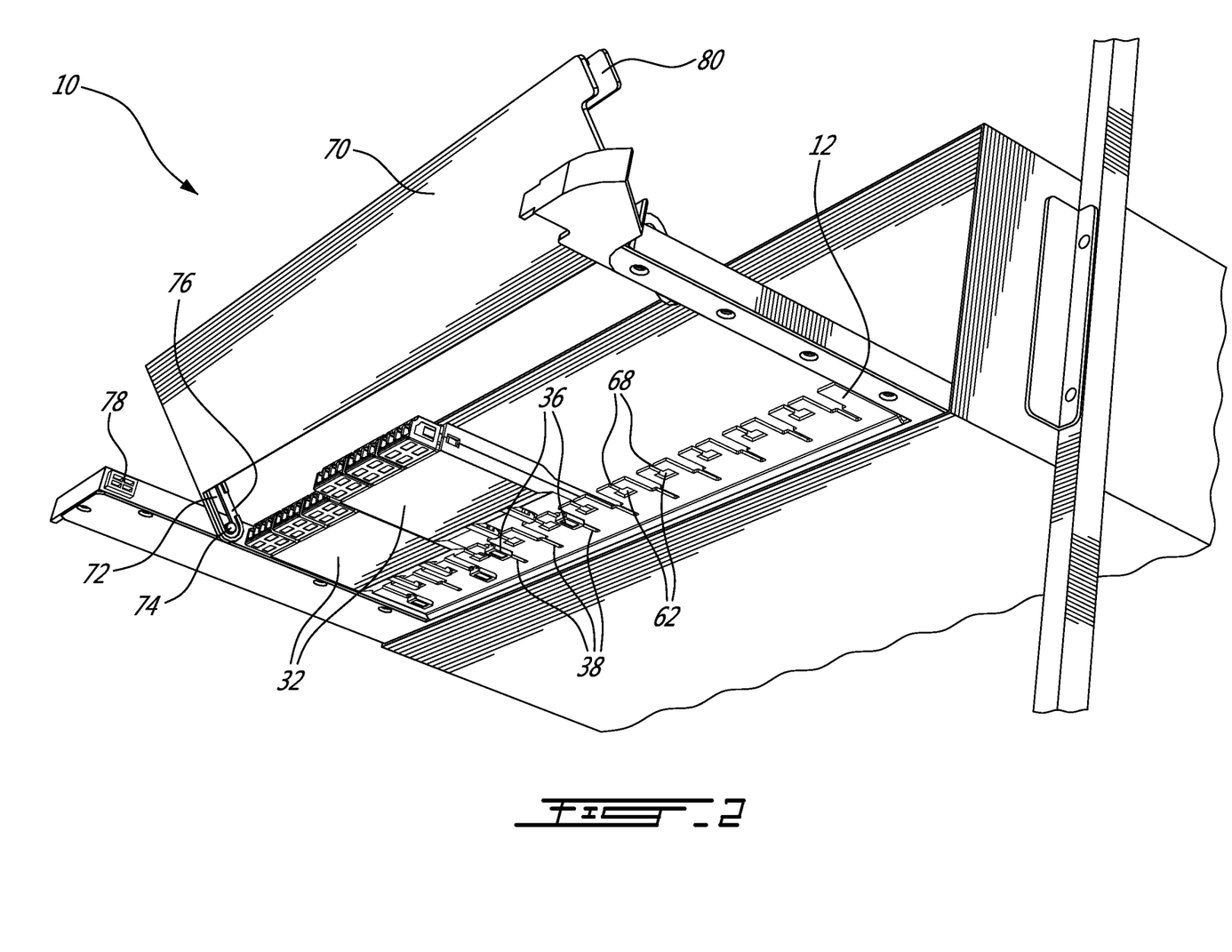
FIG. 2 provides a lowered right front perspective view of a fiber optic cassette system in accordance with an illustrative embodiment of the present invention.

Referring to FIG. 2 in addition to FIG. 1, the tray 12 receives a plurality of removable fiber optic module or cassettes 32 arranged immediately adjacent one another, touching, and side by side on an upper surface 34 of the tray. In a first embodiment each fiber optic cassette 32 is held to the tray 12 by an engagement on an underside comprising tabs 36 of inverted "T" cross section which are slid into respective slots 38 machined or otherwise formed in the tray 12. In order to better orient the cassette 32 on the tray during installation, the tray 12 comprises a raised shoulder 40 which is received within a channel 42 moulded or otherwise formed in the cassette 32. Of note is that in the disclosed cassette embodiment tabs 36 and channels 42 are provided on both sides and such that each cassette 32 is reversible.

Figure 3A:
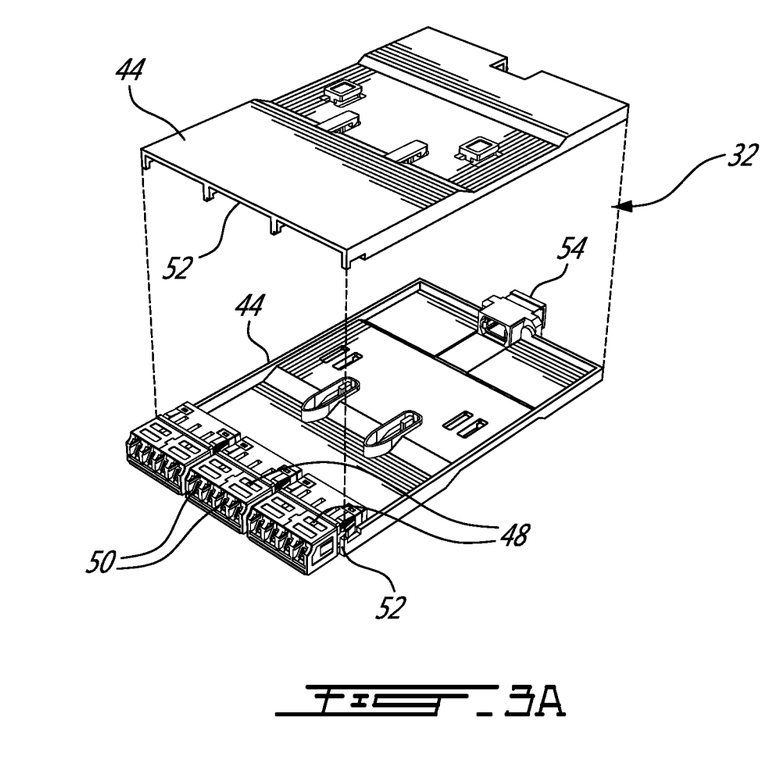
FIGS. 3A and 3B provide respectively an exploded right front perspective view and an exploded lowered left rear perspective view of a fiber optic cassette in accordance with an illustrative embodiment of the present invention.
Figure 3B:
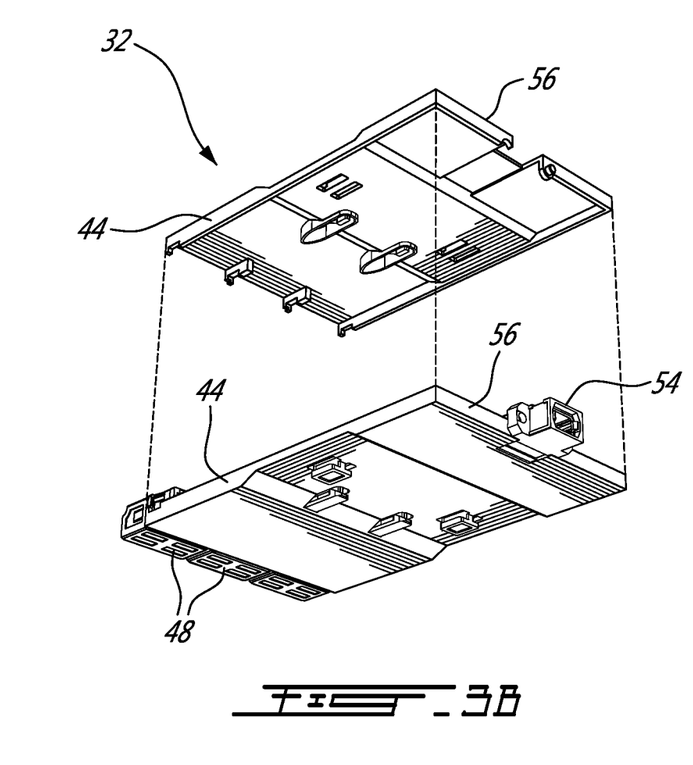
Figure 3C:
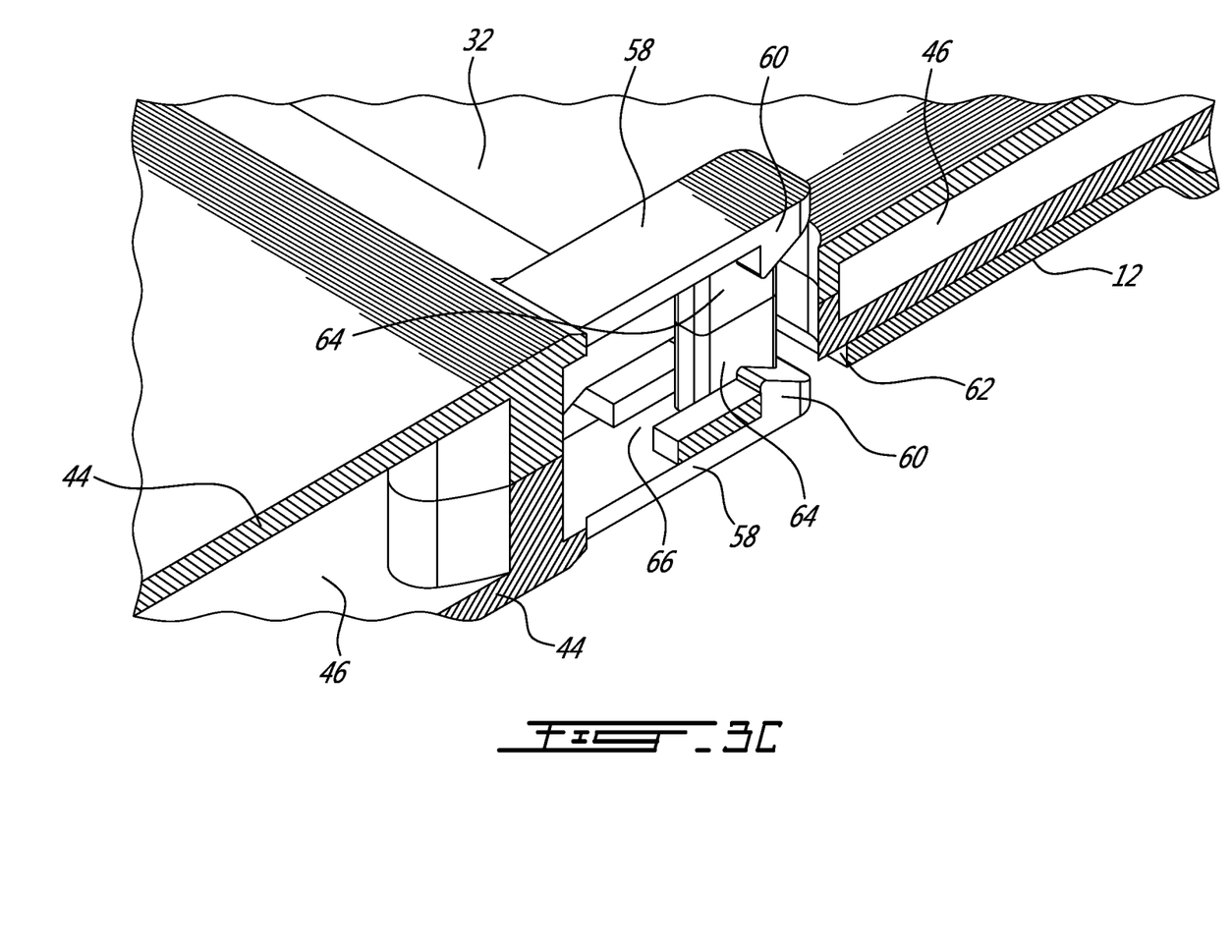
FIG. 3C provides a partial sectional view along line IIIC-IIIC in FIG. 1.

Referring now to FIGS. 3A, 3B and 3C in the first embodiment each cassette 32 comprises a pair of like housing halves 44 which together define an enclosed space 46 for receiving one or more optic fibres (not shown). The housing halves 46 are illustratively held together by an adhesive or the like but in a particular embodiment may be held together by flexible inter clocking tabs and slots (both not shown) or the like. A plurality of receptacle modules 48 each comprising a plurality of receptacles 50, illustratively LC Quad type receptacles, are snap fit into the housing in a row and exposed along a forward edge 52 of the cassette 32. The cassette 32 also illustratively provides a multi-fiber module/receptacle 54, illustratively an MPO SX type receptacle snap fit into the housing, for terminating a fiber optic cable, such as a trunk cable (not shown) or the like, comprising a plurality of optic fibers at a rearward edge 56. In this regard, each optic fiber of the fiber optic cable is interconnected with a respective one of the modules 54 using an optic fiber segment (not shown) comprising a receptacle end which is terminated by a plug (not shown). The segments, which are typically longer than the distance between the forward edge and the rearward edge, are typically looped several times within the housing of the cassette 32, for example in a serpentine or the like. A person of ordinary skill in the art will understand that an optic fiber terminated with a plug (not shown) inserted into a selected one of the receptacles 50 will interconnect the optic fiber with a selected optic fiber segment.

Figure 3D:
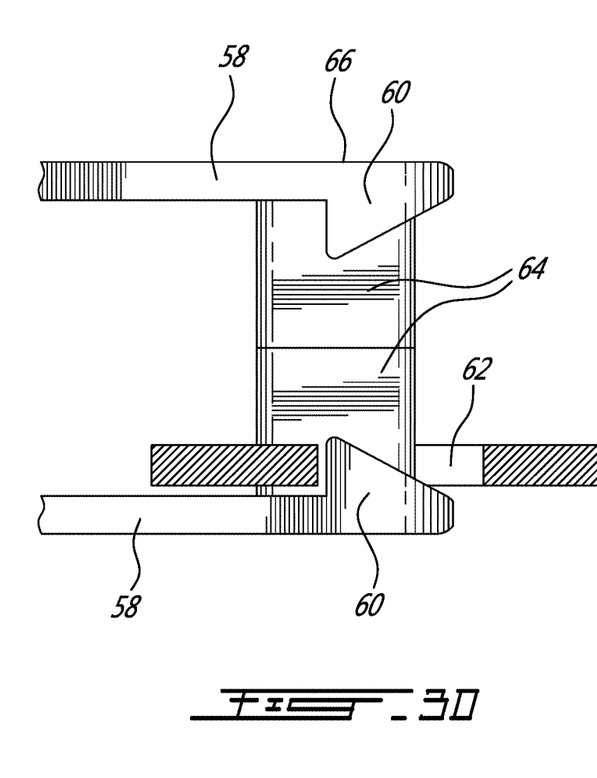
FIGS. 3D and 3E provide respectively detailed side views of a releasable engagement in accordance with an illustrative embodiment of the present invention.
Figure 3E:
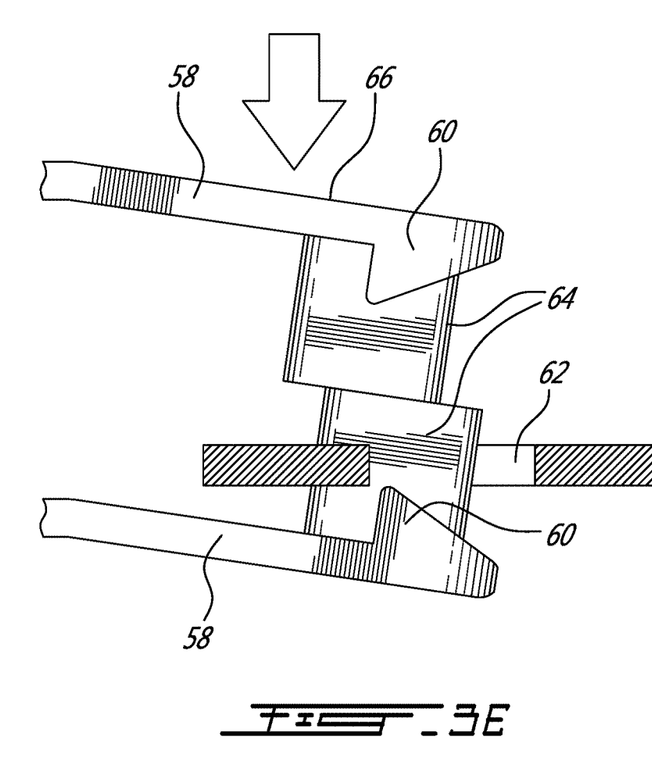

Referring now back to FIG. 2 in addition to FIGS. 3C, 3D and 3E, each housing half 44 further comprises a tray engaging feature comprising a pair of flexible cantilevered tabs 58 each comprising a hooked end 60 that is engaged in a cassette engaging feature comprising a cut-out/slot 62 machined or otherwise formed in the tray 12 when the tabs 36 are engaged within their respective slots 38, thereby forming a releasable engagement for releasably securing the cassette 32 to the tray 12. Each flexible tab 58 further comprises a post 64 bisecting the hooked end 60. Each post 64 extends into the housing from its respective tab 58 and such that when the housing halves 44 are assembly the ends of the opposing posts 64 butt against each other. This allows the upper tab 58 (whose hooked end 60 is not engaged in the cut-out 62) to be used as an actuator. Indeed, force generated by flexing the tab 58 into the housing by pressing against the outer surface 66 of the tab 58 (as indicated by the arrow in FIG. 3E) is translated by the posts 64 to the opposing flexible tab 58 and such that the hooked end 60 of the opposing flexible tab 58 is forced out of the cut-out 62 and the cassette 32 disengaged from the tray 12. A this point the inverted "T" cross section tabs 36 can be retracted from their respective slots 38 and the cassette 32 removed from the tray 12. Of note is that a gap 68 provides access to the slot 62 and such that the posts 64 can travel in and out of their respective slots 62.

Figure 4:
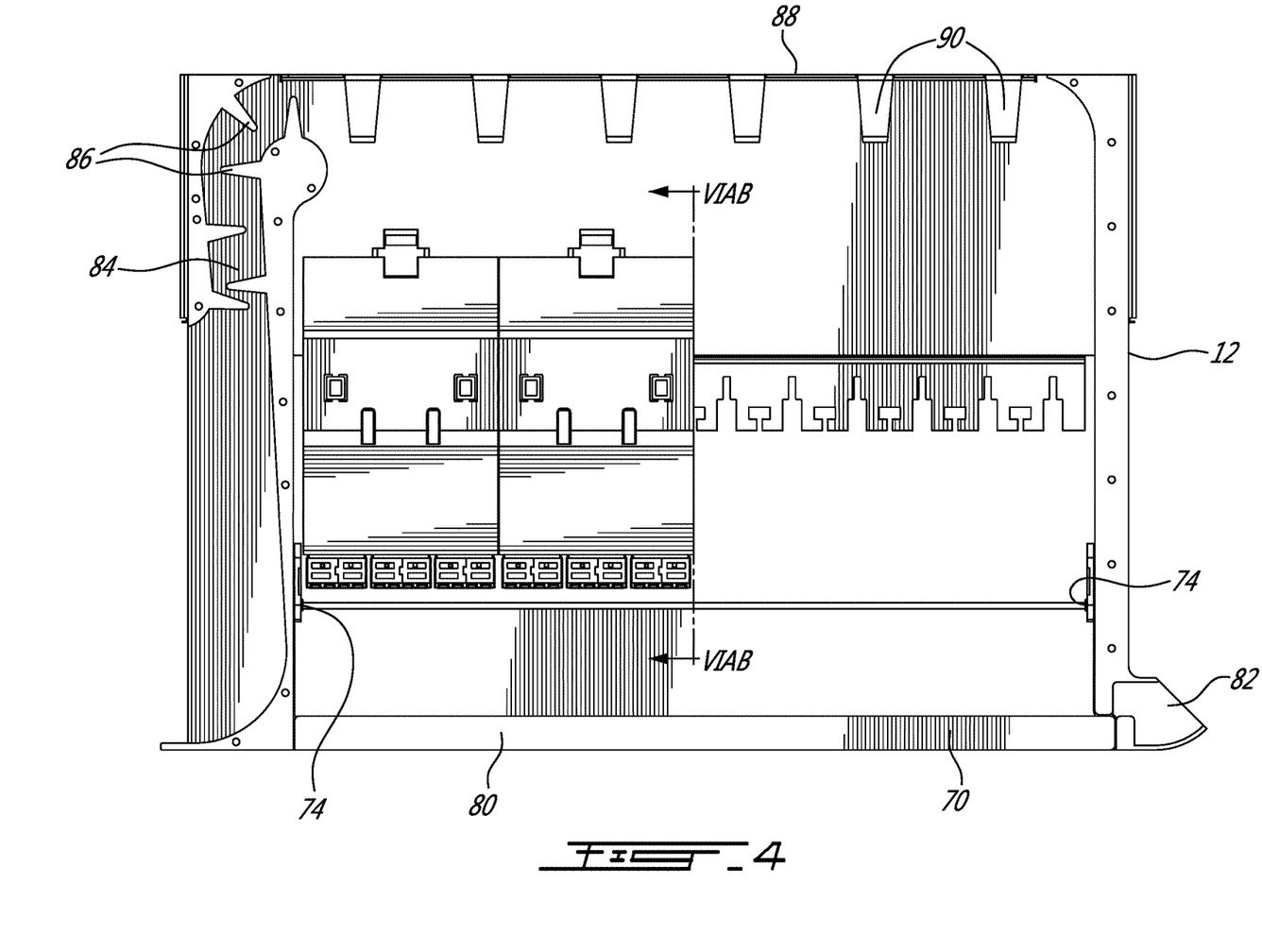
FIG. 4 provides a top plan view of a fiber optic cassette system in accordance with an illustrative embodiment of the present invention.

Referring now to FIG. 4 in addition to FIGS. 1 and 2, the system further comprises a patch cord cover 70 mounted to the front of the tray 12 via a pair of elongate slots 72 which are secured to the trays 12 at a respective pivot point 74 by a circlip 76 and about which the patch cord cover 70 may rotate. A pair of opposed bosses 78 are provided which engage with a front end 80 of the patch cord cover 70 and such that the patch cord cover 70 is held normally horizontal. As a person of ordinary skill in the art will now understand, in order to allow easy access to the cassettes 32, the patch cord cover 70 can be pulled forward such that the pivot points 74 travel within their respective slots 72 and until the front end 80 is disengaged from the bosses 78 and then rotated about the pivots points 74. A front passage 82 is provided to allow access to the receptacles 50. Provision of the cassettes 32 being engaged on their underside to the tray eliminates the use of space wasting attachment assemblies and the like which consume tray width and provides for additional space towards one side which is conveniently used as a rear passageway 84 to allow access to the modules 54, for example using a fiber optic cable such as a trunk cable (not shown). A series of intertwined fingers, 86, are provided to prevent optic fiber cables from inadvertently projecting out of the passageway 84 and for example becoming ensnared on other trays within the case 14. The tray 12 further comprises a raised rear edge 88 and a plurality of like members 90 extending inwards from the rear edge 88. The members 90 can be used to secure fiber optic cables to, for examples using zip ties (not shown) or the like.

Figure 5A:
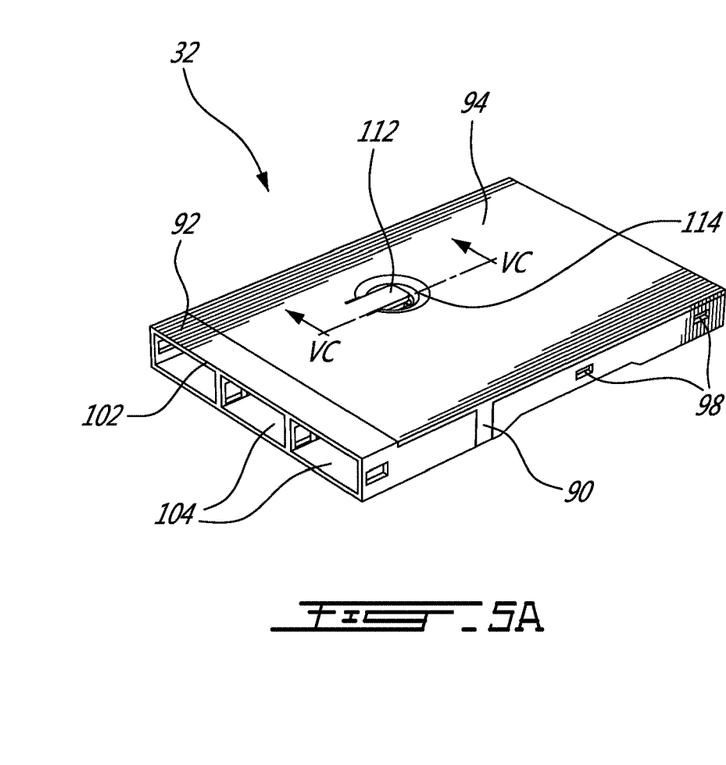
FIGS. 5A and 5B provide respectively a right front perspective view and an exploded lowered left rear perspective view of a fiber optic cassette in accordance with an alternative illustrative embodiment of the present invention.
Figure 5B:
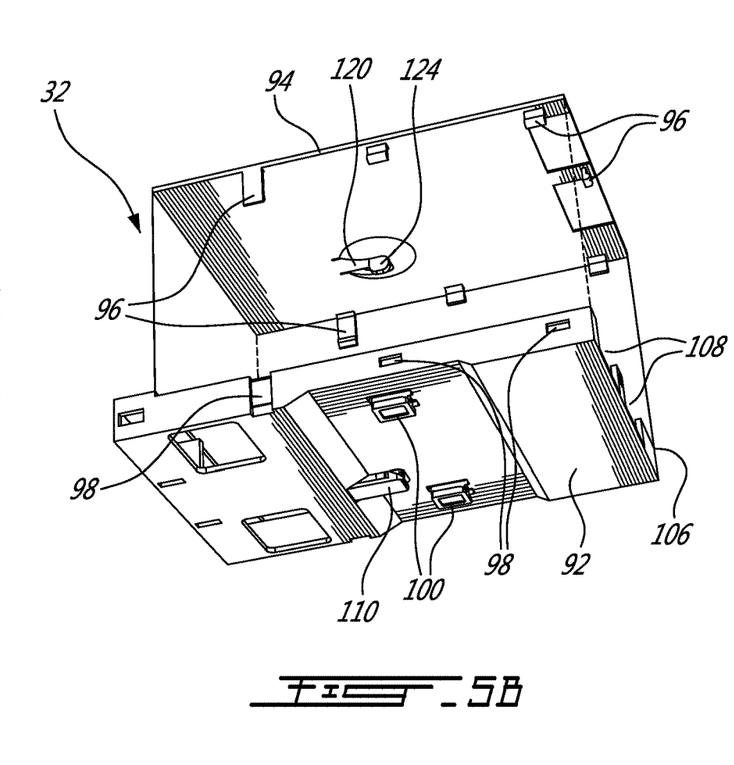

Referring now to FIGS. 5A and 5B in addition to FIG. 2, a cassette 32 in accordance with an alternative embodiment is provided. The cassette comprises a housing 92 and a removeable cover 94. The removeable cover comprises a plurality of connecting tabs 96 which are engaged by respective connecting tab receiving slots 98 in the housing 92. A pair of tabs 100 of inverted "T" cross section which are slid into respective ones of the slots 38 in the tray 12. The front face 102 of the housing 92 defines a plurality of front apertures 104 which are dimensioned to receive a respective one of a plurality of receptacle modules (not shown) such as LC Quad type receptacles or the like. Similarly, the rear face 106 defines at least one rear aperture 108 dimensioned to receive one or more receptacle modules (also not shown) such as an MPO SX type receptacle or the like.

Figure 5C:
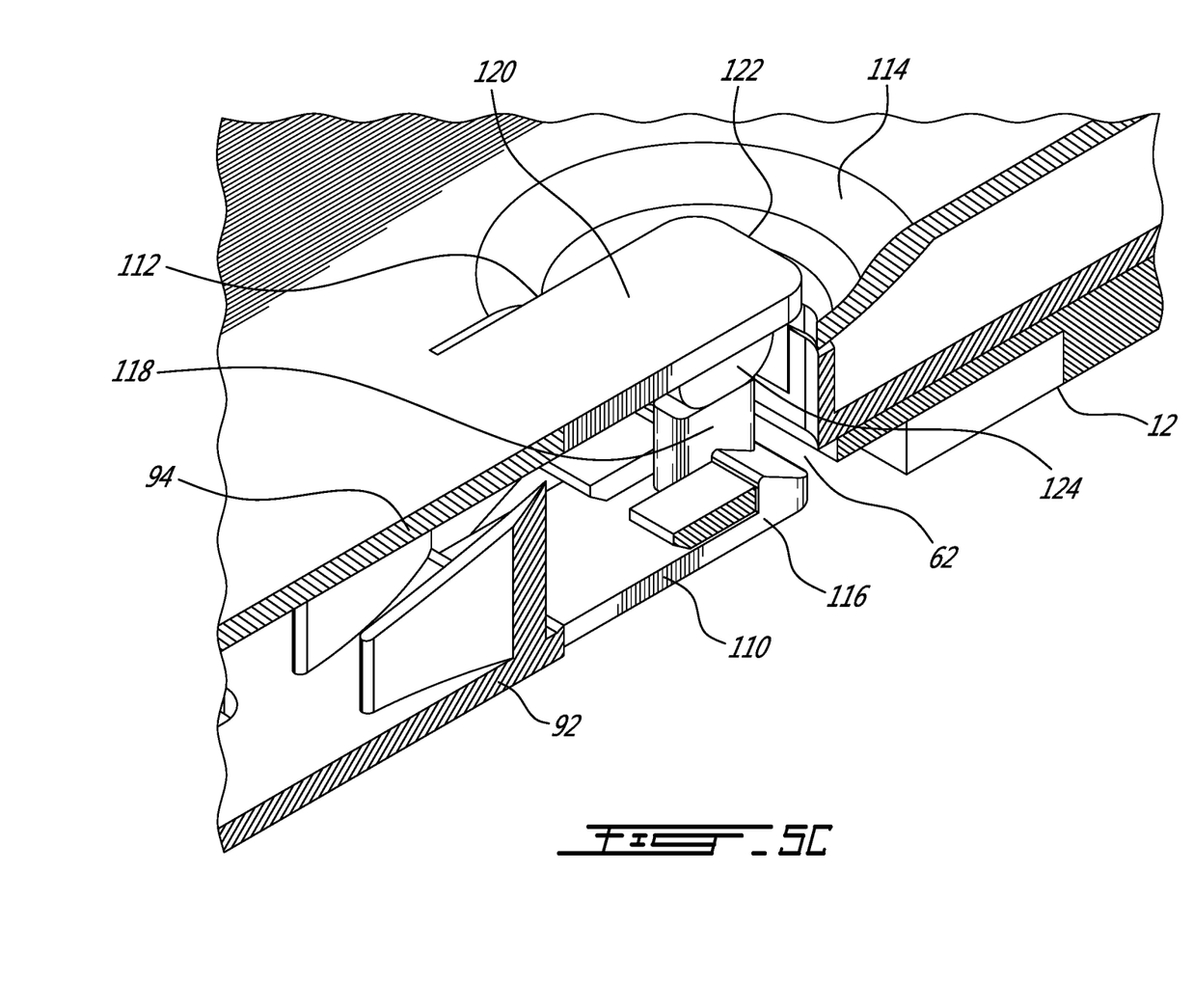
FIG. 5C provides a partial sectional view along line VC-VC in FIG. 5A.

Referring now to FIG. 5C, and as will be discussed in more detail below, a releasable engagement comprising a flexible cantilevered tab 110 is provided in the housing 92 which engages with a cut-out/slot 62 in the tray 12. In order to disengage the flexible cantilevered tab 110 from the cut-out/slot 62, a push button 112 is provided in a contoured aperture 114 in the removeable cover 94.

Figure 5D:
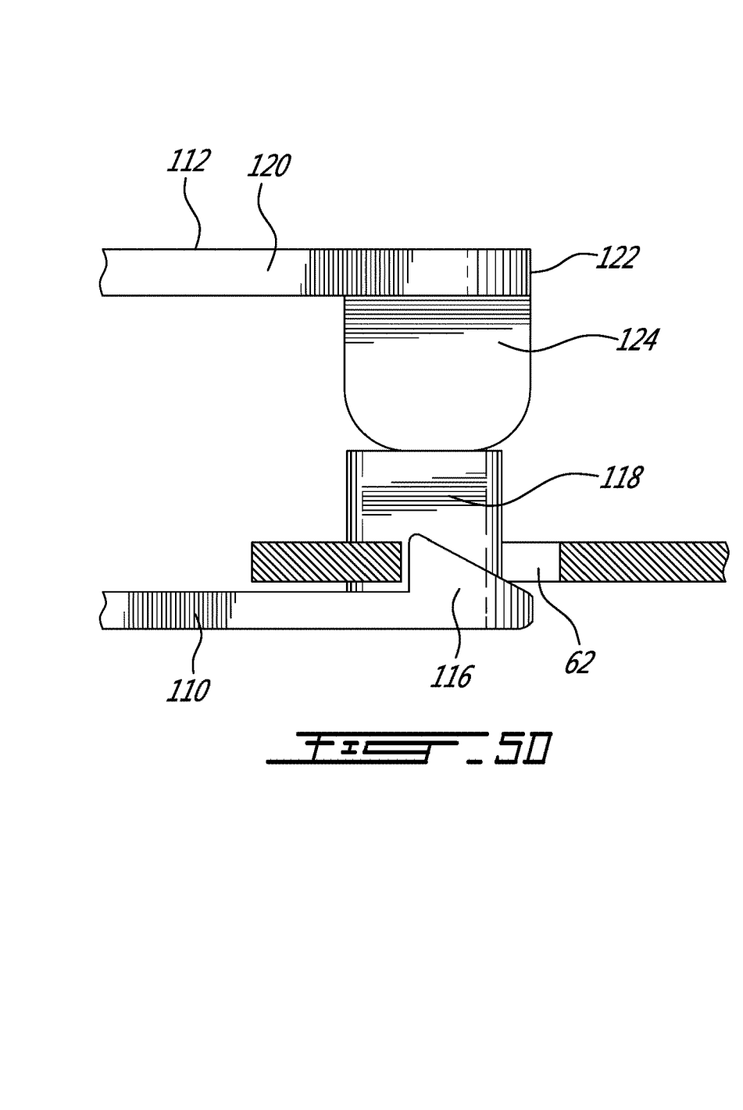
FIGS. 5D and 5E provide respectively detailed side views of a releasable engagement in accordance with an alternative illustrative embodiment of the present invention.
Figure 5E:
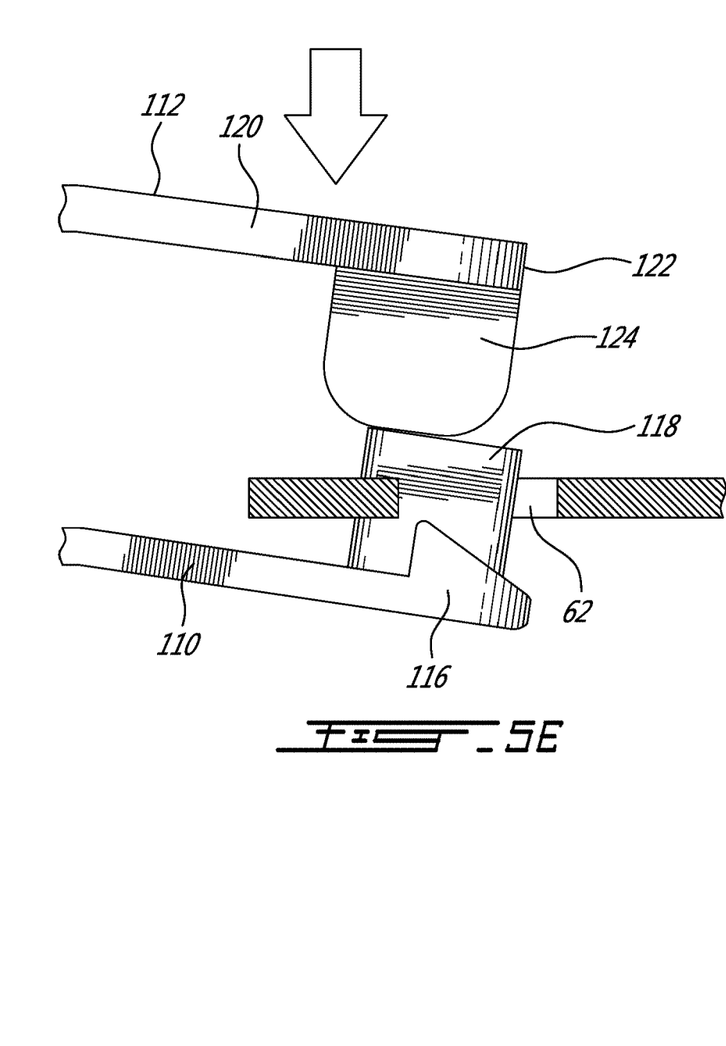

Referring now back to FIG. 2 in addition to FIGS. 5C, 5D and 5E, as discussed above the housing 92 comprises a tray engaging feature comprising a flexible cantilevered tab 110 comprising a hooked end 116 that is engaged in a cassette engaging feature comprising the cut-out 62 in the tray 12 when the tabs 100 are engaged within their respective slots 38, thereby releasably securing the cassette 32 to the tray 12. The flexible tab 110 further comprises a post 118 bisecting the hooked end 116. The pushbutton 112 comprises a flexible member 120 secured at one end to the removeable cover 94. The free end 122 of the flexible member 120 comprises a stud 124 which extends into the housing 92 when the removeable cover 94 is assembled on to the housing 92.

Still referring to FIGS. 2, 5C, 5D and 5E, the post 118 extends into the housing 92 and such that when the removeable cover is assembled to the housing 92, the post 118 butts against the stud 124. As a person of ordinary skill in the art will now understand, force generated by pressing the pushbutton 112 into the housing 92 is translated by the stud 124 via the post 118 to the flexible tab 110 and such that the hooked end 116 is forced out of the cut-out/slot 62 and the cassette 32 disengaged from the tray 12. A this point the inverted "T" cross section tabs 100 can be retracted from their respective slots 38 while the post 118 is retracted through the gap 68 and the cassette 32 removed from the tray 12.

Figure 6A:
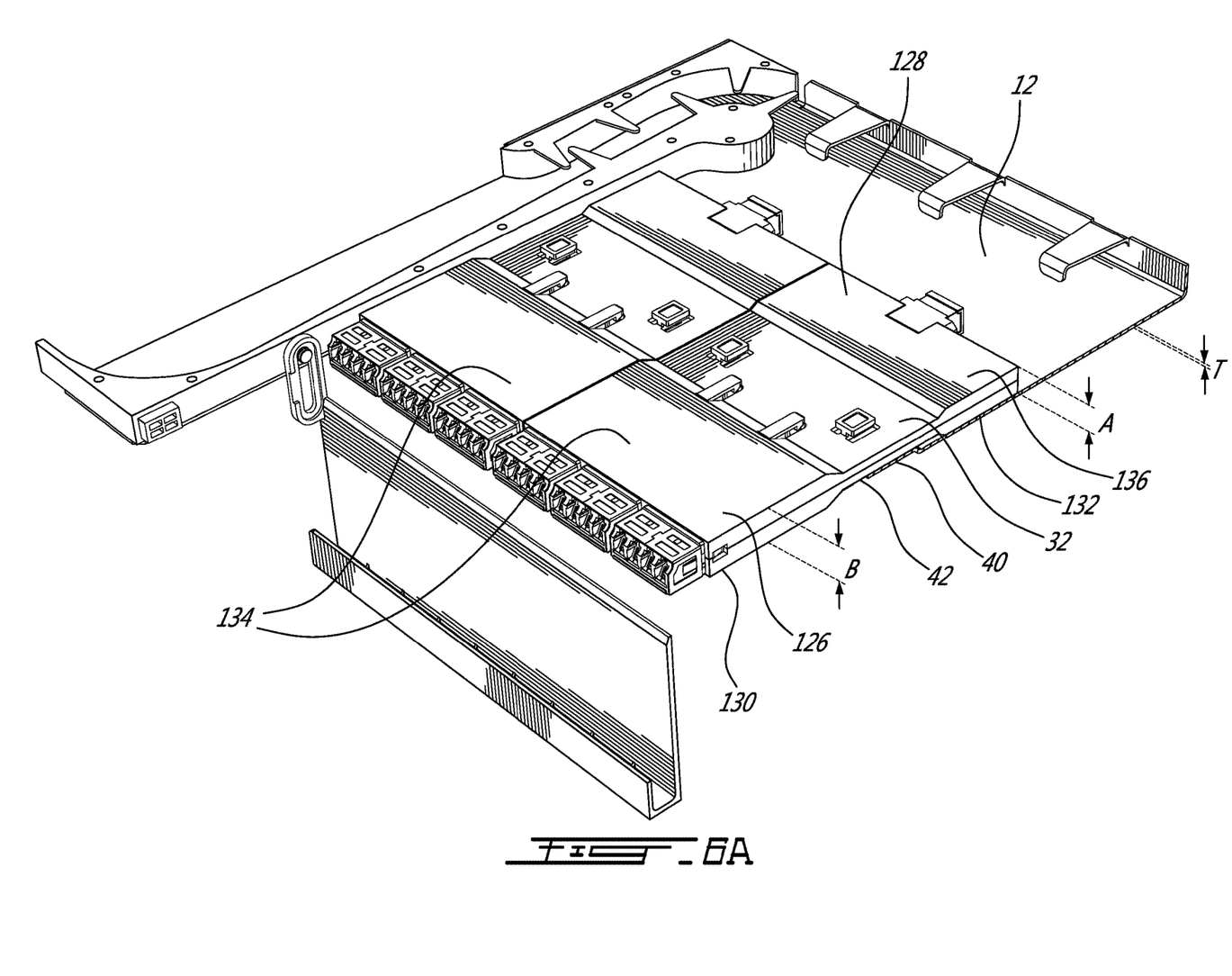
FIG. 6A provides a raised right front perspective sectional view along line VIA-VIA in FIG. 4.
Figure 6B:
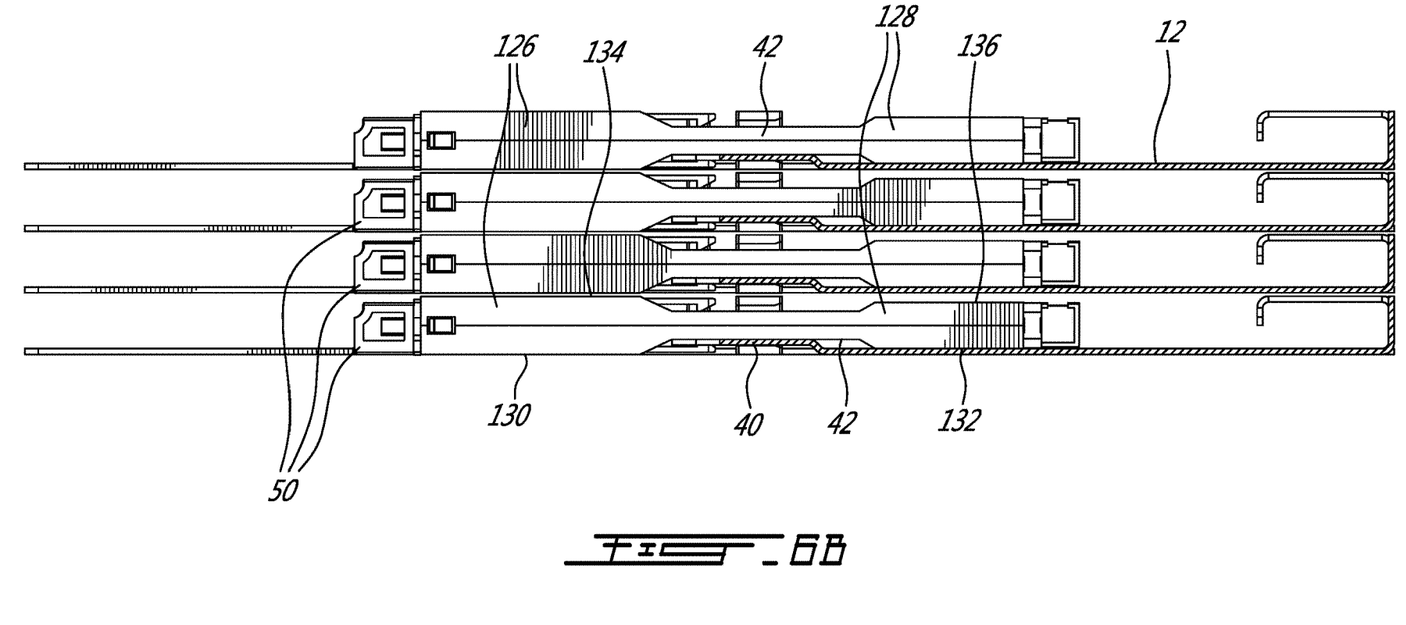
FIG. 6B provides a sectional view along line VIA-VIA in FIG. 4 of a plurality of trays stacked on one another.

Referring now to FIGS. 6A and 6B, as discussed above each cassette 32 comprises a channel 42 which receives the raised shoulder 40 and such that the cassette 32 when mounted is mounted to a top of a respective tray 12 with a forward portion 126 of the cassette 32 extending in front of the tray 12, the channel 42 positioned largely on the shoulder 40 of the tray 12 and the rearward portion 128 positioned on the top of the tray 12. The vertical dimension A of the rearward portion 128 of a cassette 32 is such that in combination with the thickness T of the tray 12 the overall dimension/thickness is substantially similar to or less than the vertical dimension/thickness B of the forward portion 126 of the cassette 32. In particular, the dimensions are selected such that when a cassette 32 is mounted to the tray 12, a bottom surface 130 of the forward portion 126 lies in the same plane as, or is flush with, a bottom surface 132 of the tray 122 to which it is mounted. In a particular embodiment, a top surface 134 of the forward portion 126 lies in the same plane as, or is flush with, a top surface 136 of the rearward portion 128.

With reference to FIG. 6B, as will now be apparent to a person of ordinary skill in the art, when stacked together with other like trays 12 and cassettes 32, provision of cassettes 32 extending in front of the trays in this manner provides for increased density of receptacles 50 along the front face thereof by eliminating the thickness of the tray between successive trays of cassettes 32. Additionally, the size of the trays 12 can be reduced which saves on material and the like.

Although the present invention has been described hereinabove by way of specific embodiments thereof, it can be modified, without departing from the spirit and nature of the subject invention as defined in the appended claims.

The invention claimed is:

1. A modular fiber optic cassette system, the system comprising:
   a case comprising a plurality of trays slideably received within a tray receiving space for movement between a stored position and an accessible position;
   a plurality of substantially flat rectangular fiber optic cassettes each arrangeable in parallel side by side along a front end of a respective one of said plurality of trays and such that when mounted on said respective one of said trays a forward portion of a housing of each of said cassettes extends in front of said respective one of said trays, and further wherein each of said cassettes comprises a first optic fiber connector-receiving receptacle arranged along a cassette housing front face within said forward portion for receiving a terminated end of the at least one first optic fiber, a second optic fiber connector-receiving receptacle arranged along a cassette housing rear face for receiving a terminated end of the at least one second optic fiber, and at least one third optic fiber within said housing, each of said at least one third optic fiber for interconnecting said terminated ends of respective ones of said at least one first optic fiber and said at least one second optic fiber; and
   an engagement between a bottom surface of each of said fiber optic cassettes and said tray, said engagement comprising a first part on said cassette bottom surface and a second part on said tray.

2. The modular fiber optic cassette system of claim 1, wherein said forward portion of each of said cassettes has a forward portion height, each of said cassettes further comprises a rearward portion having a rearward portion height, said tray has a thickness, and further wherein a combined height of said rearward portion height and said tray thickness is substantially equal to said forward portion height.

3. The modular fiber optic cassette system of claim 1, wherein for each of said cassettes when mounted on said respective tray, a bottom surface of said forward portion and a bottom surface of said respective tray lie in a first plane.

4. The modular fiber optic cassette system of claim 3, wherein for each of said cassettes a top surface of said forward portion and a top surface of said rearward portion each lie in a second plane parallel to said first plane.

5. The modular fiber optic cassette system of claim 1, wherein said case comprises a top wall and a bottom wall and two opposed side walls, each of said sidewalls attached between respective side edges of said top and bottom wall, said walls together defining said tray receiving space there between and a forward edge of each said wall together defining an opening to said tray receiving space.

6. The modular fiber optic cassette system of claim 5, wherein in said stored potion said cassettes are completely inside said tray receiving space and in said accessible position said forward portions of said cassettes are positioned in front of said opening and outside of said tray receiving space.

7. The modular fiber optic cassette system of claim 1, wherein said system is for mounting in a rack and further comprising a pair of mounting brackets, one of said brackets attached to each of said sidewalls on either side of an outside of said case, said mounting brackets for securing said case to the rack.

8. The modular fiber optic cassette system of claim 1, wherein said forward portion is at least one quarter of the overall length of the cassette.

9. The modular fiber optic cassette system of claim 1, wherein each cassette is in contact with at least one adjacent cassette.

10. A modular fiber optic cassette system, the system comprising:
a case defining a tray receiving space;
at least one tray slideably received within said tray receiving space for movement between a stored position and an accessible position;
a plurality of substantially flat rectangular fiber optic cassettes arrangeable horizontally side by side and in parallel along a front end of said at least one tray, each of said cassettes comprising a cassette housing and a first optic fiber connector-receiving receptacle arranged along a cassette housing front face for receiving a terminated end of the at least one first optic fiber, a second optic fiber connector-receiving receptacle arranged along a cassette housing rear face for receiving a terminated end of the at least one second optic fiber, and at least one third optic fiber within said cassette housing, each of said at least one third optic fiber for interconnecting said terminated ends of respective ones of said at least one first optic fiber and said at least one second optic fiber;
an engagement between a bottom surface of each of said fiber optic cassettes and said tray, said engagement comprising a first engaging part on said bottom surface and a second engaging part on said tray; and
an actuator positioned on an upper surface of said cassette for disengaging said first part from said second part.

11. The modular fiber optic cassette system of claim 10, wherein when mounted on said tray, a forward portion of each of said cassette housing extends in front of said tray.

12. The modular fiber optic cassette system of claim 10, wherein said tray comprises a raised shoulder comprising said second engaging part along a forward edge thereof, each of said cassette housing comprises a forward portion adjacent a shoulder receiving channel portion comprising said first engaging part and further wherein, when installed on said tray, said first engaging part extends no farther than a plane defined by a bottom surface of said forward portion.

13. The modular fiber optic cassette system of claim 10, wherein said first engaging part comprises a flexible hooked tab, said second engaging part comprises a slot and said actuator comprises a push button and pressing said button disengages said flexible hooked tab from said slot.

14. The modular fiber optic cassette system of claim 13, wherein said first engaging part further comprises a post extending from said flexible hooked tab to said actuator, said second engaging part comprises a post-receiving gap intersecting said slot and wherein pressing said button imparts a flexing action to said flexible hooked tab via said post such that said flexible hooked tab can be disengaged from said slot and said cassette disengaged from said tray by retracting said post through said gap.

15. A modular cassette for mounting with other like cassettes in a rack comprising a cassette receiving tray and interconnecting the terminated end of at least one first optic fiber with the terminated end of at least one second optic fiber, the tray comprising a plurality of cassette engaging features on an upper surface, the cassette comprising:
a substantially flat rectangular housing comprising a substantially flat bottom surface;
a first optic fiber connector-receiving receptacle arranged along a cassette housing front face for receiving the terminated end of the at least one first optic fiber, a second optic fiber connector-receiving receptacle arranged along a cassette housing rear face for receiving the terminated end of the at least one second optic fiber, and at least one third optic fiber within said cassette housing, each of said at least one third optic fiber for interconnecting said terminated ends of respective ones of said at least one first optic fiber and said at least one second optic fiber;
a tray engaging feature extending from said bottom surface and configured for engaging with one of the cassette engaging features; and
a release mechanism comprising an actuator positioned on an upper surface of said cassette for selectively disengaging said tray engaging feature from the engaged one of the cassette engaging features.

16. The cassette of claim 15, wherein the tray comprises a raised shoulder comprising the cassette engaging features along a forward edge thereof, each of said cassette housing comprises a forward portion adjacent a shoulder receiving channel portion comprising said tray engaging feature and further wherein, when installed on the tray, said tray engaging feature extends no farther than a plane defined by a bottom surface of said forward portion.

17. The modular fiber optic cassette system of claim 15, wherein said tray engaging feature comprises a flexible hooked tab, the cassette engaging feature comprises a slot, said actuator comprises a push button and pressing said button disengages said flexible hooked tab from the slot.

18. The modular fiber optic cassette system of claim 17, wherein said tray engaging feature further comprises a post extending from said flexible hooked tab to said actuator, said cassette engaging feature comprises a post-receiving gap intersecting the slot and wherein pressing said button imparts a flexing action to said flexible hooked tab via said post such that said flexible hooked tab can be disengaged from the slot and said cassette disengaged from the tray by retracting said post through the gap.

* * * * *